(12) United States Patent
Simon et al.

(10) Patent No.: US 11,224,310 B2
(45) Date of Patent: Jan. 18, 2022

(54) INDUCTION BURNER IGNITION SYSTEM

(71) Applicant: Dansons US, LLC, Scottsdale, AZ (US)

(72) Inventors: Paul J. Simon, Phoenix, AZ (US); Michael R. Giebel, Phoenix, AZ (US)

(73) Assignee: Dansons US, LLC, Scottsdale, AZ (US)

( * ) Notice: Subject to any disclaimer, the term of this patent is extended or adjusted under 35 U.S.C. 154(b) by 136 days.

(21) Appl. No.: 16/403,788

(22) Filed: May 6, 2019

(65) Prior Publication Data
US 2019/0335949 A1 Nov. 7, 2019

Related U.S. Application Data

(60) Provisional application No. 62/667,869, filed on May 7, 2018.

(51) Int. Cl.
| | |
|---|---|
| *A47J 27/00* | (2006.01) |
| *A47J 37/07* | (2006.01) |
| *H05B 6/12* | (2006.01) |
| *H05B 6/10* | (2006.01) |

(52) U.S. Cl.
CPC .......... *A47J 37/0722* (2013.01); *H05B 6/105* (2013.01); *H05B 6/12* (2013.01)

(58) Field of Classification Search
CPC .. A47J 37/043; A47J 37/0704; A47J 37/0718; A47J 37/0722; A47J 37/0754; A47J 37/0759; A47J 37/0763; A47J 37/0786; A47J 37/079; H05B 6/105; H05B 6/12; H05B 6/129

USPC .......... 99/331; 110/186, 233, 234, 267, 275, 110/276, 282, 295, 296, 327, 328, 101 R, 110/103, 104 B, 110; 126/67, 145, 501, 126/502

See application file for complete search history.

(56) References Cited

U.S. PATENT DOCUMENTS

| | | | | |
|---|---|---|---|---|
| 5,297,493 | A * | 3/1994 | Nuesmeyer | F23B 1/38 110/233 |
| 2004/0134397 | A1 * | 7/2004 | Ingvarsson | F23L 1/00 110/347 |
| 2004/0142081 | A1 | 7/2004 | Durand et al. | |

(Continued)

FOREIGN PATENT DOCUMENTS

| | | |
|---|---|---|
| CN | 101631403 | 1/2010 |
| WO | 0184048 | 11/2001 |
| WO | 2009141808 | 11/2009 |

OTHER PUBLICATIONS

PCT Search Report and Written Opinion for Application No. PCT/US19/30844 dated Jul. 19, 2019, 7 pages.

*Primary Examiner* — Hung D Nguyen

(74) *Attorney, Agent, or Firm* — Seyfarth Shaw LLP

(57) ABSTRACT

Disclosed is an induction burner ignition system that implements an induction burner located external to the fire pot. The induction burner can be controlled by a controller to start and stop according to a predetermined heating algorithm, and can further provide heat via heat sinks in contact with the induction burner. Because the induction burner is located external to the fire pot, it is easily repairable or replaceable and avoids the harmful atmosphere of the fire pot. The induction burner also provides more uniform heating than conventional hot rod technology to improve the pellet heating process.

9 Claims, 4 Drawing Sheets

(56) References Cited

U.S. PATENT DOCUMENTS

2007/0221205 A1 9/2007 Landon
2018/0310761 A1* 11/2018 Morello ............ B01D 46/0038

* cited by examiner

INDUCTION BURNER IGNITION SYSTEM

TECHNICAL FIELD OF THE INVENTION

The presently disclosed embodiments relate generally to devices and methods for heating pellets in pellet smokers and grills. More particularly, the presently disclosed embodiments relate to devices and methods for heating pellets using induction burners.

BACKGROUND OF THE INVENTION

Pellet grills and pellet smokers are popular outdoor cooking appliances. These devices cook meat or other food by combusting pellets in a fire pot. The pellets provide the necessary heat to cook the food while also providing flavor based on the ingredients assembled into the pellet. For example, the pellets can create a smoke flavor from the various types of wood within the pellet.

In conventional pellet smokers and grills, pellets are heated in a fire pot with holes. For example, as shown in FIG. 4, an ignition system 400 is shown with an auger 405 that feeds pellets into a fire pot 410 with holes 415. The pellets are heated by a hot rod 420 within the fire pot 410. For example, a user can turn a knob on a controller to select a specified temperature, and the pellet grill can heat the hot rod 420 for approximately five minutes. The auger 405 is then controlled to turn and distribute pellets into the fire pot 410 based on the algorithm of the controller. For example, the controller may rotate the auger 405 faster or more often to deliver more pellets and therefore generate more heat, or vice versa to reduce the heat inside the smoker or grill. A fan can also provide air flow into the fire pot 410 to assist in the combustion of pellets, as determined by the controller.

In conventional pellet grills, the hot rod 420 is located inside the fire pot 410 and is surrounded by flames and smoke. This not only makes the hot rod 420 susceptible to failure, but replacing the hot rod 420 is more difficult due to the spatial constraints of the hot rod 420 being located inside the fire pot 410. The hot rod 420 also cycles on and off to combust pellets, which reduces the life of the hot rod 420.

SUMMARY OF THE INVENTION

The presently disclosed embodiments include an induction burner ignition system that uses an induction burner located outside of the fire pot as opposed to a hot rod located within the fire pot. The induction burner can be turned on via the controller and controlled to heat the fire pot to more evenly heat pellets and provide uniform temperature control. The induction burner can also be located outside of the fire pot to allow easier replacement if the induction burner fails, and to avoid the damaging smoke and flames inherent in fire pots. Additionally, heat sinks can be provided external to the fire pot and in contact with the induction burner so heat can be dissipated in areas that are advantageous to the cooking process, for example the cook chamber of the grill or smoker.

In particular, the presently disclosed embodiments include an induction furnace system including a fire pot having a bottom surface, an auger that provides pellets to the fire pot for heating therein, and an induction burner that causes at least the bottom surface of the fire pot to heat via induction heating, to thereby heat the pellets according to a control of a controller. The induction burner is spaced from an inside of the fire pot.

Further disclosed is a grill including a housing, a fire pot located within the housing and having a bottom surface, a controller associated with the fire pot and controllable by a user to cause the housing to heat to a temperature determined by the user, an auger that provides pellets to the fire pot for heating therein, and an induction burner that causes at least the bottom surface of the fire pot to heat via induction heating, to thereby heat the pellets according to a control of a controller. The induction burner is spaced from an inside of the fire pot.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
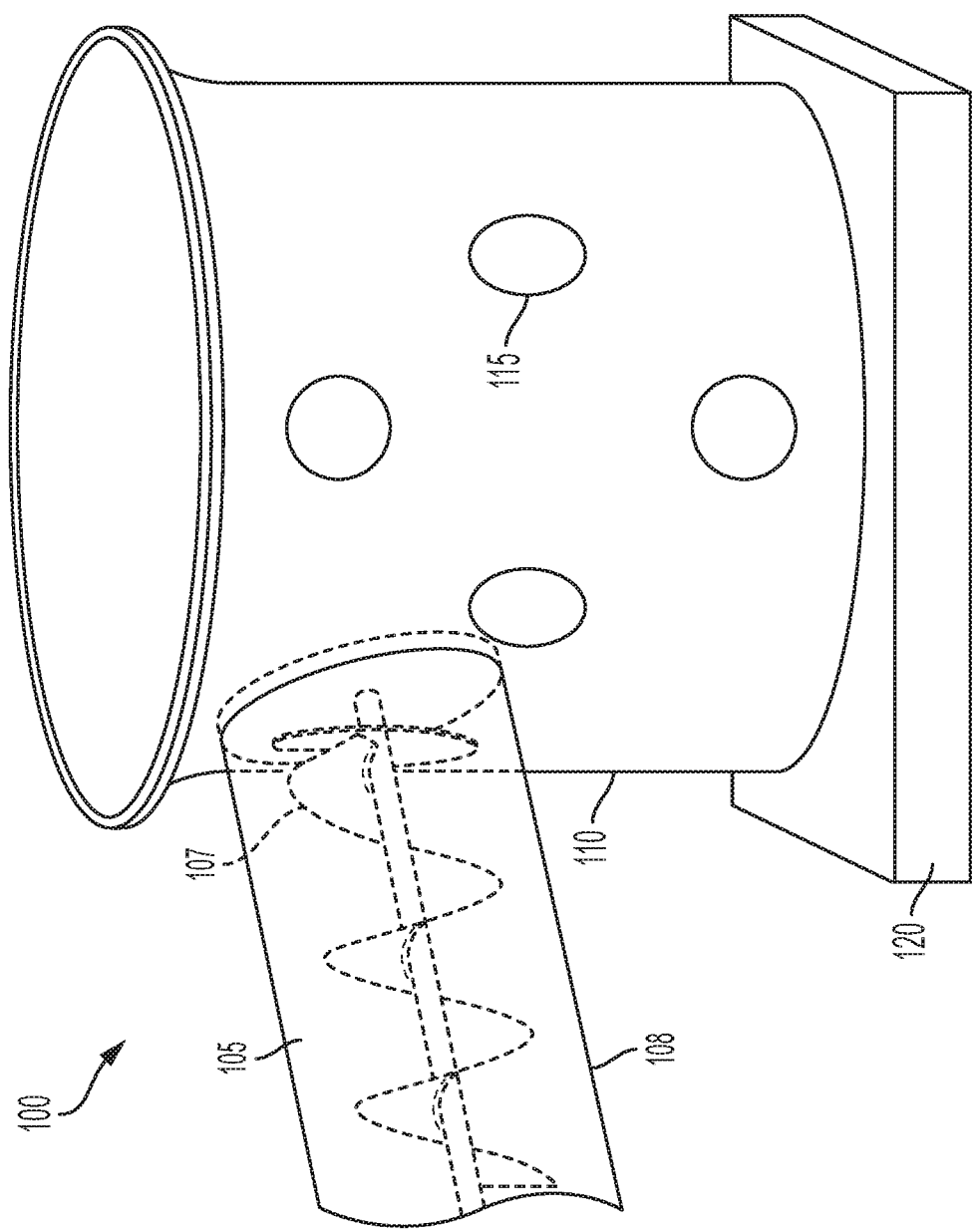
FIG. 1 is a front perspective view of an induction burner ignition system according to at least some of the presently disclosed embodiments.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The presently disclosed embodiments include an induction burner ignition system that uses an induction burner instead of a hot rod. The induction burner can be located external to the fire pot to be easily repairable or replaceable and to avoid the harmful atmosphere of the fire pot. The induction burner can provide uniform heating to the pellets and otherwise direct heat in advantageous locations to improve the pellet heating process and the cooking process as a whole.

Figure 2:
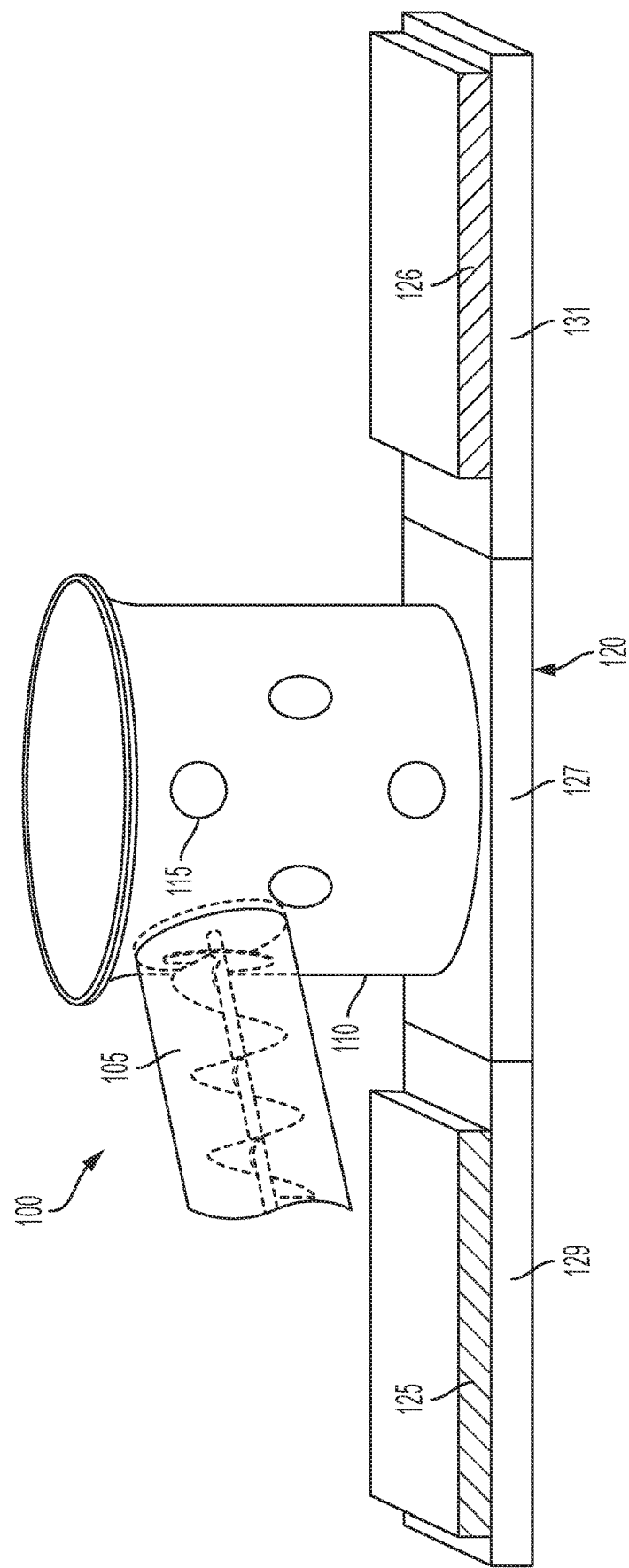
FIG. 2 is a front perspective view of another induction burner ignition system according to at least some of the presently disclosed embodiments.
Figure 4:
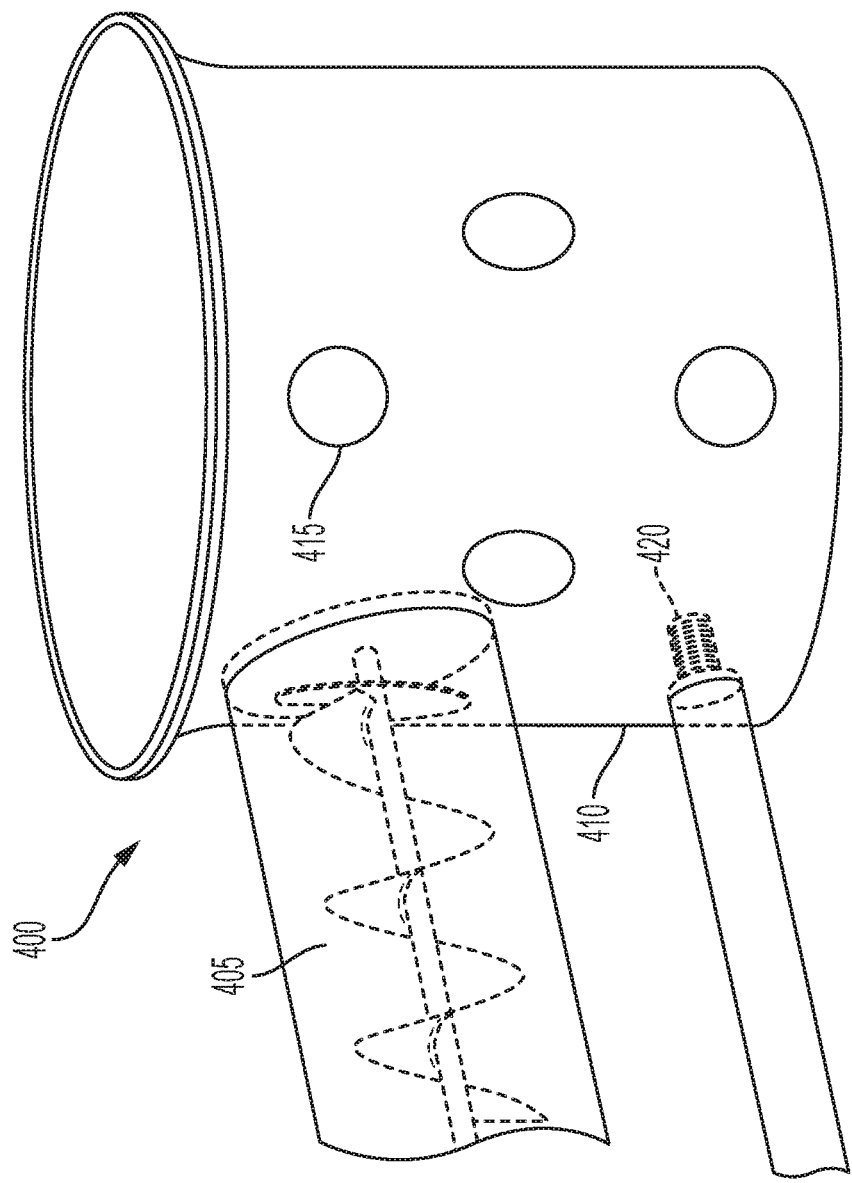
FIG. 4 is a front perspective view of a prior art ignition system.

As shown in FIGS. 1-2, an induction burner ignition system 100 includes an auger 105 that provides pellets to a fire pot 110, where the pellets are heated to provide heat and flavor to food that is cooked in a cooking chamber. The fire pot 110 can include holes 115 to provide air flow and oxygen for the combustion of the pellets. Rather than a conventional hot rod 420, as shown in FIG. 4, the ignition system 100 can include an induction burner 120 located external to the fire pot 110 and that heats the fire pot 110 based on the instructions of a controller. For example, the controller may control the induction burner 120 to heat the fire pot 110, and thus the pellets, for a five minute increment and then to turn off. The controller can also control a fan to provide additional air flow and to further assist with the pellet heating process.

As shown, the auger 105 can be a conventional auger with a housing that includes internal spiral flighting 107 that rotates. Alternatively, the auger 105 can be a rotating barrel with flighting 107 coupled to the internal wall 108 of the auger 105. The auger 105 can also be positioned at any angle, for example at an incline, based on the arrangement of the ignition system 100.

The fire pot 110 can be any shape or size and can, in some embodiments, be made of a ferromagnetic material such as stainless steel or iron, for example cast iron. The material of the fire pot 110 can be useful because the induction burner 120 causes ferromagnetic materials to heat due to a current running through the inside of the burner 120 in, for example, a coil shape. The current causes a magnetic field that then causes the ferromagnetic material to heat.

In use, the pellet grill or smoker controller can be turned on, thereby turning on the induction burner 120 for a predetermined period of time to heat the pellets. During this time, the fan can provide additional air flow as needed to improve the heating process. The auger 105 can then rotate to provide pellets to the fire pot 110 as needed. These processes work together to collectively maintain the temperature set by the user at the controller.

The above process is advantageous over conventional fire pots because it provides a more even heating to the pellets due to the induction burner 120 causing heat to be provided by the fire pot 110. That is, the induction burner 120 itself does not heat up the pellets, but rather it causes a ferromagnetic material in the fire pot 110 to provide this heat and the larger surface area fire pot 110 thereby provides more even temperature distribution to the pellets. In some embodiments, the fire pot 110 may itself be made of a ferromagnetic material in which the induction burner 120 would heat the fire pot 110 across its bottom surface. Accordingly, the pellets provided by the auger 105 are heated more evenly, and more pellets would be ignited quicker to produce more smoke and reach the desired temperature in a shorter period of time. The even heating of the pellets also results in a more controllable heating process, reducing temperature spikes and resulting in a more uniform cooking routine.

Additionally, because the induction burner 120 is located outside the fire pot 110 (i.e., spaced from the inside of the fire pot 110), the induction burner 120 can be more easily replaced or repaired when needed, as compared to conventional hot rods. The induction burner 120 will also be functional longer than a conventional hot rod because the induction burner 120 will not be as impacted by the smoke and flames of the fire pot 110. Still additionally, the induction burner 120 will cycle on and off but will not itself heat during these cycles, therefore rendering the induction burner 120 more durable than the conventional hot rod.

FIG. 2 illustrates a second embodiment of the presently disclosed embodiments with similar numbering. Here, the induction burner 120 extends well beyond the bottom surface of the fire pot 110, or alternatively includes separate burners that are spaced from the fire pot 110 and that are heated separately from the fire pot 110. These external burners of the induction burner 120 can provide heat to ferromagnetic heat sinks 125, 126 that can then radiate heat to other areas of the pellet grill or smoker, for example the cook chamber. Here, the controller could be used to control the amount of heat provided by the induction burner 120 through the heat sink 125, 126 to help stabilize the temperature provided to the cook chamber. Alternatively, or in addition to the above, the heat radiated through the heat sink 125, 126 could be used for a user who prefers a flavor with less smoke, as the heat provided through the heat sink 125, 126 would be heat produced without necessarily combusting pellets. The user could determine the amount of smoke flavor through an interface and the controller could increase or decrease that amount by diverting heat to and from the heat sinks 125, 126 rather than through the fire pot 110.

The heat sinks 125, 126 can be any size or shape, and any material, that are capable of dissipating heat. In some embodiments, the heat sinks 125, 126 are made of a ferromagnetic material to allow the induction burner 120 to cause the heat sinks 125, 126 to heat when the induction burner 120 is turned on. In this manner, the heat sinks 125, 126 are different from conventional heat sinks in that the purpose of the heat sinks 125, 126, in some embodiments, is to create heat from the induction burner 120 and dissipate it in a specific direction. For example, the heat sink 125, 126 can be shaped as a pyramid or other similar shape such that heat can be created at the induction burner 120 interface with the broad bottom surface of the heat sink 125, 126 and then dissipate through the point of the heat sink 125, 126 towards the desired area (e.g., the cooking chamber).

In an embodiment, the induction burner 120 can be separated into a central burner 127 and first 129 and second 131 auxiliary burners that are separately controllable via a controller. For example, the controller can control the central burner 127 to receive current and therefore to cause heat to flow in the fire pot 110 due to induction heating. The controller can separately control the auxiliary burners 129, 131 to receive current and cause the auxiliary heat sinks 125, 126 to heat, either together or independently from each other, so as to provide heat to other parts of the cooking appliance (e.g., the cooking chamber). In this manner, heat can be selectively provided through induction heating to the fire pot 110 as well as other areas of the grill.

Figure 3:
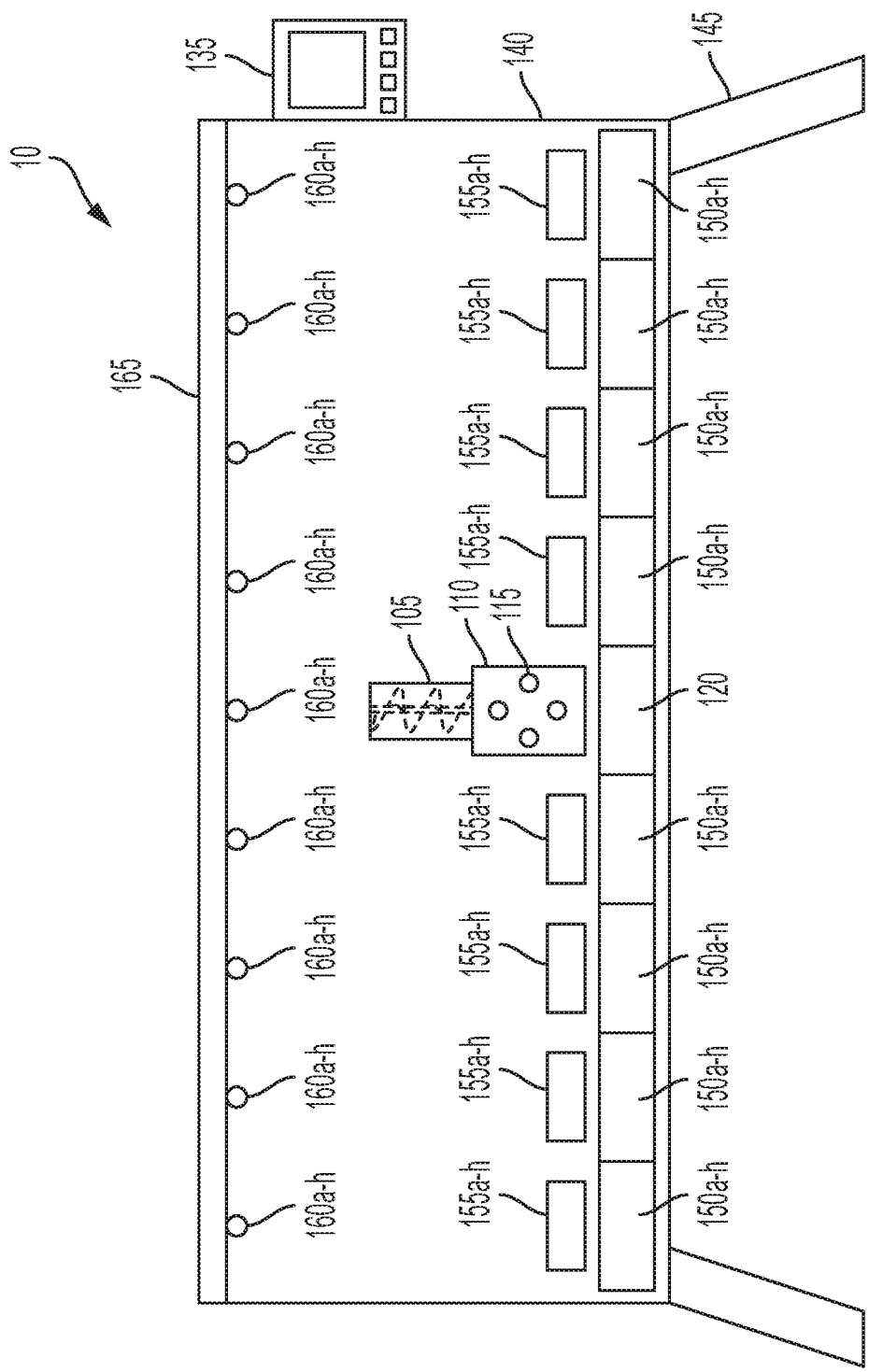
FIG. 3 is a schematic illustration of a grill according to at least some of the presently disclosed embodiments.

As shown in FIG. 3, a grill 10 is schematically shown as including a controller 135 coupled to a housing 140 supported by legs 145. Within the housing 140 are various auxiliary burners 150a-n which include, for example, the auxiliary induction burners 129, 131 that provide heat separate from that provided to the fire pot 110. For purposes of simplicity, these auxiliary burners will collectively be referred to as element 150a-n and can be any number of burners; and the auxiliary heat sinks will be referred to as element 155a-n and can be any number of heat sinks, either equal to, less than, or more than the number of burners 150a-n. As shown, the fire pot 110 is located adjacent the induction burner 120 and, as discussed above, can be heated by current flowing through the induction burner 120 due to induction heating. Auxiliary burners 150a-n can further cause heating of the auxiliary heat sinks 155a-n as described above to provide targeted heat to portions of the grill.

The controller 135 can control heating of the heat sinks 155a-n in a unique manner to avoid so-called "hot spots" in the grill 10. For example, the grill 10 can include sensors 160a-n located near the cooking surface 165 that sense the temperature of the cooking surface 165 at that particular location. The sensors 160a-n can communicate the temperature at the respective sensor 160a-n to the controller 135, which can then control the flow of current to the auxiliary burners 150a-n and induction burner 120 to more evenly distribute heat to the cooking surface 165. For example, if the left-most sensor 160a-n registers an excessively low heat (i.e., below the temperature set by the user at the controller), the controller 135 can cause current to flow to the left-most auxiliary burner 150a-n to therefore cause the left-most heat sink 155*a-n* to heat, thereby directing heat to the left-most sensor 160*a-n* located proximate the cooking surface 165 until the desired heat is reached. In an embodiment, the sensors 160*a-n* and auxiliary burners 150*a-n* can each be independently controllable and communicable with the controller 135 such that the controller 135 can heat portions of the grill needing additional heat. The sensors 160*a-n* can effectively provide a feedback loop to the controller 135 to establish a consistent temperature heating surface 165 at each section of the heating surface 165, either in addition to, or replacing, the heat provided by the pellets or other material reaching the fire pot 110.

As used herein, the term "grill" can mean any outdoor or indoor cooking appliance, including, but not limited to, a conventional gas grill, charcoal grill, pellet grill, kamado grill, bullet smoker, offset smoker, barrel smoker, or any other outdoor grill or smoker.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. An induction furnace system comprising:
   a fire pot having a lower-most surface;
   an auger that provides pellets to the fire pot for heating therein; and
   an induction burner located under the lower-most surface so as to cause at least the lower-most surface of the fire pot to heat via induction heating, to thereby heat the pellets according to a control of a controller; and
   a heat sink spaced from the fire pot and interacting with the induction burner so as to cause heat to be emitted via induction heating,
   wherein the induction burner is spaced from an inside of the fire pot.

2. The induction furnace system of claim 1, further comprising holes defined in the fire pot and allowing ventilation therethrough.

3. The induction furnace system of claim 1, wherein the auger includes internal fighting that rotates iso as to deliver the pellets.

4. The induction furnace system of, wherein the induction burner includes a central burner for causing the fire pot to heat, and an auxiliary burner for causing the heat sink to heat via induction heating.

5. The induction furnace of claim 4, wherein the auxiliary burner is independently controllable from the induction burner to cause the heat sink to heat.

6. The induction furnace of claim 4, further comprising a sensor coupled to the controller and causing the controller to allow current to flow to at least one of the induction burner and the auxiliary burner based on an output of the sensor to the controller.

7. An induction furnace system comprising:
   a fire pot having a bottom surface;
   an auger that provides pellets to the fire pot for heating therein; and
   an induction burner that causes at least the bottom surface of the fire pot to heat via induction heating, to thereby heat the pellets according to a control of a controller; and
   a heat sink spaced from the fire pot and interacting with the induction burner so as to cause heat to be emitted via induction heating,
   wherein the induction burner is spaced from an inside of the fire pot.

8. The induction furnace system of claim 7, wherein the induction burner includes a central burner for causing the fire pot to heat, and an auxiliary burner for causing the heat sink to heat via induction heating.

9. The induction furnace of claim 8, further comprising a sensor coupled to the controller and causing the controller to allow current to flow to at least one of the induction burner and the auxiliary burner based on an output of the sensor to the controller.

\* \* \* \* \*